UNITED STATES PATENT OFFICE.

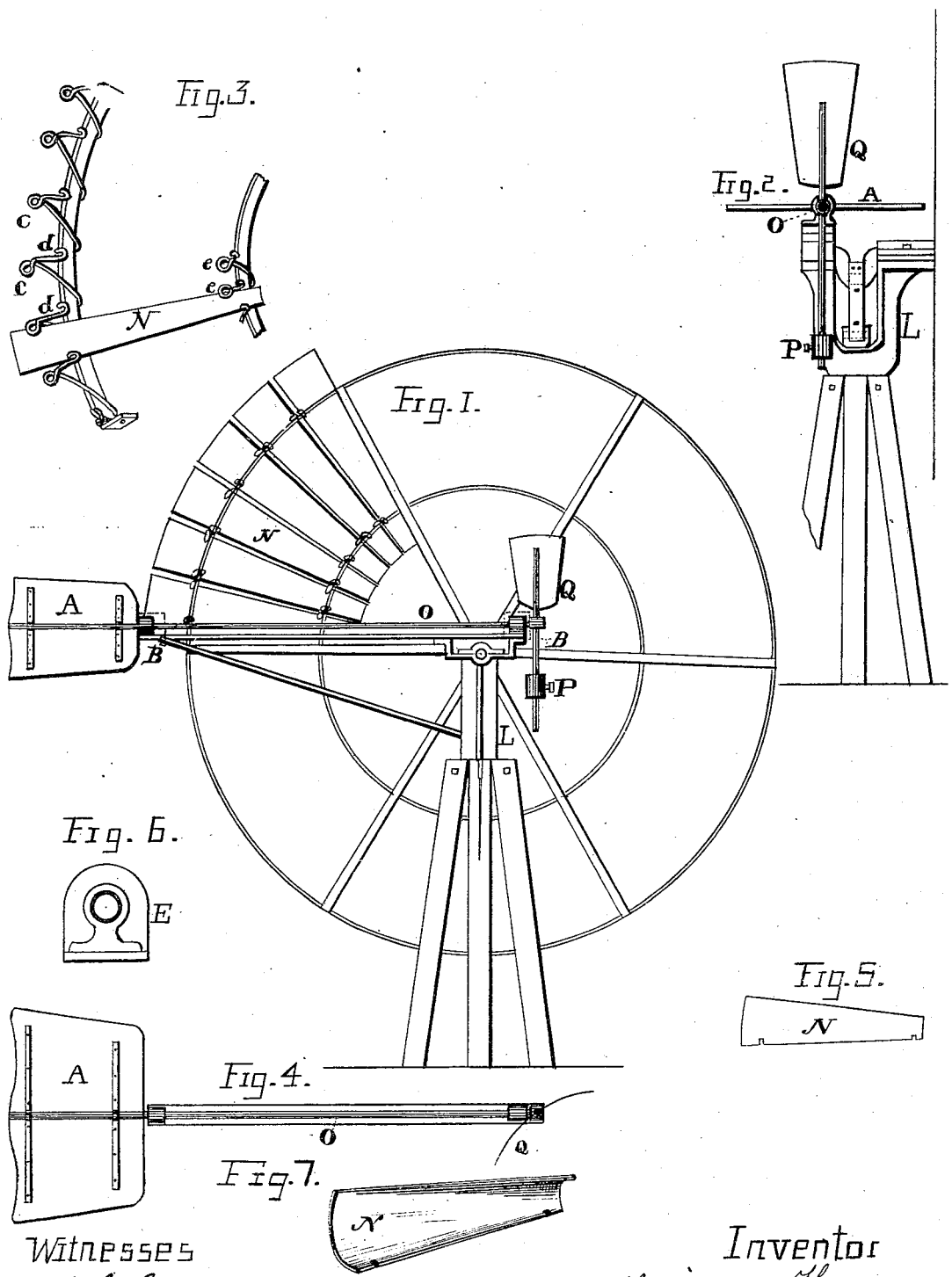

ALEXANDER THOMSON, OF AMES, IOWA.

WIND-ENGINE.

SPECIFICATION forming part of Letters Patent No. 241,248, dated May 10, 1881.

Application filed August 18, 1880. (No model.)

*To all whom it may concern:*

Be it known that I, ALEXANDER THOMSON, a citizen of the Dominion of Canada, residing at Ames, in the county of Story and State of Iowa, have invented certain new and useful Improvements in Wind-Engines; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to improvements in the apparatus for governing the engine and to the manner of fixing the vanes to the face of the wheel. The wheel is placed behind the tower, and is turned around against the wind by a side vane.

In the accompanying drawings, Figure 1 is a front elevation of my improved wind-engine; Fig. 2, a side elevation of the head and the two governing-vanes. Fig. 3 is a perspective view of a detached segment, showing the manner in which a wire is bent around it to form a series of clasps for holding the vanes or sails on the wheel. Fig. 4 is a horizontal projection of the governing-vanes, showing their relative position. Fig. 5 is a detached view of one of the vanes or sails of the wheel; and Fig. 6, a detached view of one of the boxes which carry the shaft O, with its covering to protect it from sleet.

L is the head, upon which are formed suitable boxes, in which the wheel-shaft runs.

B B is an arm securely fastened to the head L, and supported at its outer end by a brace, B L, or in any other suitable manner. Upon this arm are placed suitable boxes, which support a shaft, O, the inner ends of the arm B B and shaft O passing only a little beyond the center of the wheel. (This is an essential point.)

On the inner end of the shaft O a vane, Q, and weight P are attached to an arm, this arm being placed at a right angle to the plane of the main vane A, and is hung on the outer end of the shaft O and beyond the edge of the wheel. The plane of the vane Q (*i. e.*, the general direction of its surface) does not lie parallel to the shaft O, but at an angle of nearly forty-five degrees to it. This is in order to allow the wind to retain its hold on the vane Q as it is turned over and as the whole machine turns edgewise to the wind. By making this angle forty-five degrees the tendency to turn the vane Q and the shaft O is the same when the wheel stands facing the wind or when it stands edgewise to it. By making the angle less any desired variation of this tendency may be attained, as the engine turns out of the wind. By hanging the vane A on the shaft O so that it passes through its center, thus balancing the force of the wind on it, and adjusting the vane Q to obtain the proper variation of the force of the wind upon it, together with the proper adjustment of the weight P, a nearly-constant velocity of the wind-wheel will be obtained. The vane Q is placed opposite the opening in the center of the wheel, and in front of it far enough to let it turn over, and where the increased current due to this opening can act upon it; hence the arm B B and shaft O are extended as little beyond the center as possible.

The shaft O should make such an angle with the plane of the wheel as to cause it to stop when the main vane A stands vertical. In Fig. 1 the vanes A and Q are partly turned in order to show them.

E, Fig. 6, is a covering over the boxes of the shaft O, to protect them from sleet.

The vanes or sails are attached to iron arcs, as shown in Fig. 3. This is done by fastening one end of a wire to the end of an arc, then bringing it up and forming a loop, as at *c e*, then down to the same side of the arc, then across the top, as at *d*, then down to and around the bottom and up to the next succeeding place for a loop, &c., thus forming a continuous set of clasps for holding the vanes or sails. The vanes have small notches cut in their edges, as shown in Fig. 5. The notch is slipped onto the wire at *d*, while that part of it which is bent over the top of the arc lies along the face of the vane and holds it down. The other edge is then sprung under the loop *c*. The notches in the edge hold it from flying out endwise. At the inner end of the vanes another set of clasps of like construction, and at intermediate points others may be put in, the number depending on the size of the wheel. These clasps are so made as to hold the vanes or sails at a less angle to the plane of the wheel as they recede from the center. The vanes are made concave and the clasps hold them in a twist, thus giving them the proper shape for greatest efficiency. When the vanes are thus placed in the clasps they are securely fastened. The great advantage of this method of fastening them is, that the mill can be erected no matter how the wind blows, as one can be put in at a time. The wheel stands far enough back of the tower so that the wind acting on it will always bring it back to face the wind after the main vane returns to the horizontal position.

Having thus fully described my invention, what I claim as new, and desire to secure by Letters Patent, is—

1. In the construction of wind-wheels, the notched concave vane N, in combination with the wire clasp formed by securing one end of a continuous wire to the arc, then carrying it up and forming a loop, c, then down to the same side of the arc, thence across the top at d, then down to and around the bottom of said arc, and thence upward, thus forming a series of eye-loops, whereby the vanes are securely held in the desired position to the arc, substantially as and for the purpose set forth.

2. In the construction of a wind-wheel, the notched concave vane N, in combination with a wire clasp which secures the same to the arc, substantially as and for the purpose set forth.

3. In a wind-wheel, the within-described notched and graduated concave vane N and continuous wire forming the loops c d and e e, as described, in combination with the arcs to which the vanes are secured, substantially as and for the purposes set forth.

In testimony whereof I affix my signature in presence of two witnesses.

ALEXANDER THOMSON.

Witnesses:
J. L. GEDDES,
M. J. CROSSMUN.